United States Patent
Kim

(10) Patent No.: US 9,287,794 B2
(45) Date of Patent: Mar. 15, 2016

(54) RESONANCE-TYPE POWER SUPPLY APPARATUS

(71) Applicant: SAMSUNG ELECTRO-MECHANICS CO., LTD., Suwon, Gyunggi-do (KR)

(72) Inventor: Chong Eun Kim, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 287 days.

(21) Appl. No.: 13/950,935

(22) Filed: Jul. 25, 2013

(65) Prior Publication Data

US 2014/0321168 A1    Oct. 30, 2014

(30) Foreign Application Priority Data

Apr. 29, 2013  (KR) .......................... 10-2013-0047631

(51) Int. Cl.
  *H02M 3/335*  (2006.01)
  *H02M 3/337*  (2006.01)
  *H02M 1/00*   (2007.01)

(52) U.S. Cl.
  CPC ...... *H02M 3/337* (2013.01); *H02M 2001/0058* (2013.01); *Y02B 70/1491* (2013.01)

(58) Field of Classification Search
  CPC ............ H02M 3/33507; H02M 3/337; H02M 2001/0058
  USPC .............. 363/17, 20, 21.01, 21.02, 21.03, 97, 363/132
  See application file for complete search history.

(56) References Cited

U.S. PATENT DOCUMENTS

| | | | |
|---|---|---|---|
| 6,038,141 A | 3/2000 | Ochiai | |
| 6,344,979 B1 | 2/2002 | Huang et al. | |
| 6,351,401 B1 | 2/2002 | Scheel et al. | |
| 7,522,430 B2 * | 4/2009 | Osaka | ........................ 363/21.02 |

(Continued)

FOREIGN PATENT DOCUMENTS

| | | |
|---|---|---|
| JP | 2004282962 A | 10/2004 |
| JP | 2007-274789 A | 10/2007 |
| KR | 1999-0045555 | 6/1999 |

OTHER PUBLICATIONS

Korean Office Action dated Sep. 5, 2014 issued in the corresponding Korean Patent Application No. 10-2013-0047631 (English translation).

(Continued)

*Primary Examiner* — Matthew Nguyen
(74) *Attorney, Agent, or Firm* — NSIP Law

(57) ABSTRACT

There is provided a resonance-type power supply apparatus capable of controlling primary side switching by estimating output power based on resonance current of the primary side. The resonance-type power supply apparatus includes a switching unit switching input power, a transformer including a primary winding receiving the power switched by the switching unit and a secondary winding magnetically coupled to the first winding and having a preset turns ratio, and transforming the received switched power according to the turns ratio, a resonance unit electrically connected between the switching unit and the transformer and providing a resonance tank resonating with inductance from the transformer, and a controlling unit controlling the switching of the switching unit based on resonance power information input to the primary winding of the transformer by the resonance unit.

23 Claims, 5 Drawing Sheets

(56) References Cited

U.S. PATENT DOCUMENTS

| | | | |
|---|---|---|---|
| 7,688,600 B2* | 3/2010 | Sauerlander et al. | 363/17 |
| 8,649,189 B2* | 2/2014 | Tang et al. | 363/21.02 |
| 2004/0183507 A1 | 9/2004 | Amei | |
| 2012/0134705 A1* | 5/2012 | Fukutani | 399/88 |
| 2012/0327692 A1* | 12/2012 | Cantoro | 363/21.03 |
| 2013/0010502 A1* | 1/2013 | Chen | 363/21.02 |
| 2013/0170252 A1* | 7/2013 | Nishino et al. | 363/21.02 |

OTHER PUBLICATIONS

Kaist Ph.D. Thesis, "New Single-Phase Power Factor Correction Circuits and Design of High Efficiency DC/DC Converter for Distributed Power System," Published Nov. 23, 1995.

Korean Office Action issued in Korean Application No. 10-2013-0047631 dated Feb. 28, 2014, w/English translation.

* cited by examiner

RESONANCE-TYPE POWER SUPPLY APPARATUS

CROSS-REFERENCE TO RELATED APPLICATIONS

This application claims the priority of Korean Patent Application No. 10-2013-0047631 filed on Apr. 29, 2013, in the Korean Intellectual Property Office, the disclosure of which is incorporated herein by reference.

BACKGROUND OF THE INVENTION

1. Field of the Invention

The present invention relates to a resonance-type power supply apparatus in which a degree of freedom of power conversion control is improved.

2. Description of the Related Art

Generally, various electronic apparatuses meeting various needs of users have been variously implemented. Such electronic apparatuses may use a power supply apparatus supplying operating power in order to implement corresponding functions.

The power supply apparatus may generally use a switched-mode power supply scheme due to advantages thereof such as power conversion efficiency, miniaturizability, and the like.

As a power conversion scheme of the switched-mode power supply, various schemes such as a fly-back scheme, a forward scheme, and the like may be used, where a resonant scheme such as a serial resonant scheme, an inductor-inductor-capacitor (LLC) scheme, or the like may be used due to various advantages such as power conversion control, a degree of design freedom, and the like.

A resonance-type power supply apparatus using the known scheme performs switching control on a primary side by receiving feedback regarding output power as in an invention described in the following related art document, such that an element, insulated between the primary side and a secondary side and transferring signals, such as a one-to-one transformer or a photo coupler, needs to be used, and manufacturing costs may thereby be increased.

Particularly, in a case of wireless power transfer process that has recently been in the spotlight, the primary side and the secondary side are separated from a device for sending power and a device for receiving power, and thus, a one-to-one transformer or a photo coupler may not be used, such that it may be difficult to control a primary side switching.

RELATED ART DOCUMENT

Korean Patent Laid-open Publication No. 1999-0045555

SUMMARY OF THE INVENTION

An aspect of the present invention provides a resonance-type power supply apparatus capable of controlling primary side switching by estimating output power based on resonance current of a primary side.

According to an aspect of the present invention, there is provided a resonance-type power supply apparatus, including: a switching unit switching input power; a transformer including a primary winding receiving the power switched by the switching unit and a secondary winding magnetically coupled to the first winding and having a preset turns ratio, and transforming the received switched power according to the turns ratio; a resonance unit electrically connected between the switching unit and the transformer and providing a resonance tank resonating with inductance from the transformer; and a controlling unit controlling the switching of the switching unit based on resonance power information input to the primary winding of the transformer by the resonance unit.

The controlling unit may control the switching of the switching unit by estimating output power based on the resonance power information.

The resonance unit may form the resonance tank with the inductance from the transformer by including at least one capacitor and at least one inductor.

The resonance unit may form one resonance tank of a serial resonance tank and an inductor-inductor-capacitor (LLC) resonance tank.

The resonance unit may further include at least one resonance inductor.

The controlling unit may control the switching of the switching unit by estimating the output power based on current information of resonance power of the resonance unit.

The controlling unit may control the switching of the switching unit by estimating the output power based on voltage information regarding the resonance power of the resonance unit.

The controlling unit may detect a maximum value of resonance current of the resonance unit and estimate resonance voltage provided when the maximum value of the resonance current is detected, as the output power.

The controlling unit may detect voltage across both end terminals of the at least one resonance inductor and may estimate a voltage level of power applied to the primary winding of the transformer when the level of the detected voltage across both end terminals of the at least one resonance inductor is zero (0), as the output power.

The resonance-type power supply apparatus may further include an outputting unit stabilizing and outputting converted power from the secondary winding of the transformer.

The switching unit, the primary winding of the transformer, the resonance unit, and an the controlling unit may be included in a first electronic device, and the secondary winding of the transformer and the outputting unit may be included in a second electronic device physically separated from the first electronic device.

According to an aspect of the present invention, there is provided a resonance-type power supply apparatus, including: a switching unit switching input power; a transformer including a primary winding receiving the power switched by the switching unit and a secondary winding magnetically coupled to the first winding and having a preset turns ratio, and transforming the received switched power according to the turns ratio; a resonance unit electrically connected between the switching unit and the transformer and providing a resonance tank resonating with inductance from the transformer in a serial resonance scheme; and a controlling unit controlling the switching of the switching unit by estimating output power based on resonance power information input to the primary winding of the transformer by the resonance unit.

The resonance unit may form the resonance tank with the inductance from the transformer by including a capacitor and a first inductor.

The controlling unit may detect voltage across both end terminals of the resonance inductor and may estimate a voltage level of power applied to the primary winding of the transformer provided when the level of the detected voltage across both end terminals of the resonance inductor is zero (0) voltage, as the output power.

According to an aspect of the present invention, there is provided a resonance-type power supply apparatus, including: a switching unit switching input power; a transformer including a primary winding receiving the power switched by the switching unit and a secondary winding magnetically coupled to the first winding and having a preset turns ratio, and transforming the received switched power according to the turns ratio; a resonance unit electrically connected between the switching unit and the transformer and providing a resonance tank resonating with inductance from the transformer in an inductor-inductor-capacitor (LLC) resonance scheme; and a controlling unit controlling the switching of the switching unit by estimating output power based on resonance current information input to the primary winding of the transformer by the resonance unit.

The controlling unit may detect a maximum value of resonance current of the resonance unit and may estimate resonance voltage provided when the maximum value of the resonance current is detected, as the output power.

The controlling unit may include: a detecting unit detecting the maximum value of the resonance current; a comparing unit comparing one voltage of voltage between the capacitor and a ground and voltage between the inductor and the ground when the maximum value of the resonance current is detected by the detecting unit to preset reference voltage; a frequency generator generating a frequency signal having a switching frequency according to the comparison result of the comparing unit; and a gate driver providing a switching signal controlling the switching of the switching unit in response to the frequency signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Figure 1:
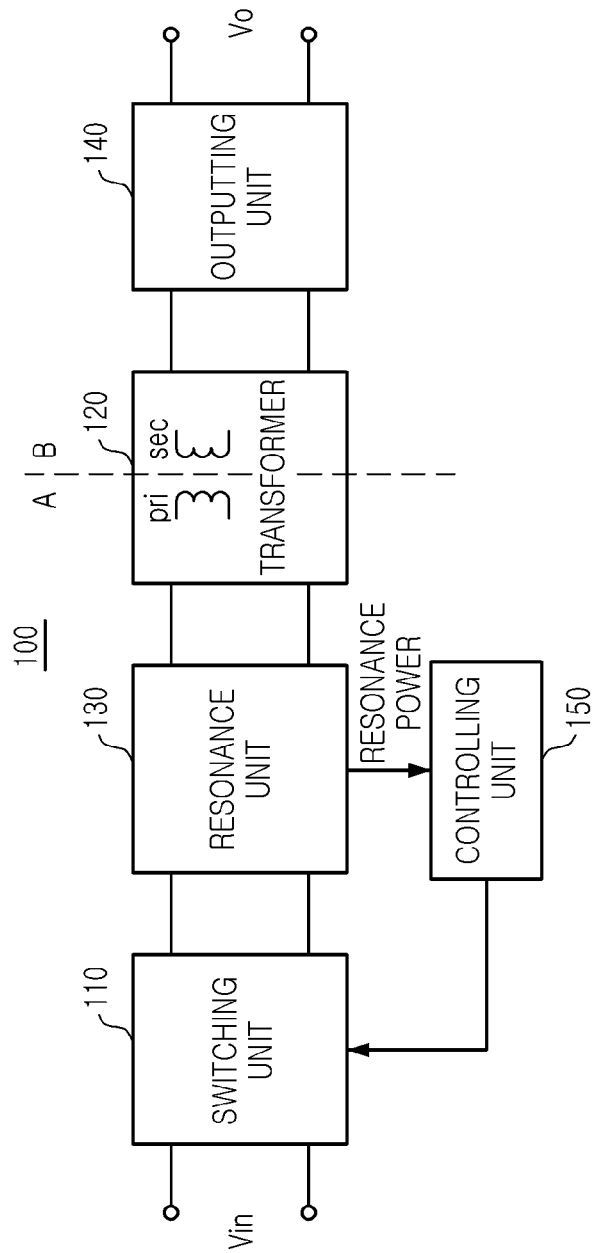
FIG. 1 is a schematic block diagram of a resonance-type power supply apparatus according to an embodiment of the present invention.

FIG. 1 is a schematic block diagram of a resonance-type power supply apparatus according to an embodiment of the present invention.

Referring to FIG. 1, the resonance-type power supply apparatus 100 according to the embodiment of the present invention may include a switching unit 110, a transformer 120, a resonance unit 130, an outputting unit 140, and a controlling unit 150.

The switching unit 110 may convert characteristics of power by switching input power Vin according to a control, and the transformer 120 may transform the switched power from the switching unit 110 according to a turns ratio by a magnetic coupling between a primary winding pri and a secondary winding sec by including the primary winding pri and the secondary winding sec.

In this case, the resonance unit 130 may be electrically connected between the switching unit 110 and the transformer 120 to enable the power supply apparatus according to the embodiment of the present invention to perform a power conversion operation in a resonance scheme.

The resonance unit 130 may LC resonate the switched power according to a switching of the switching unit 110 and transfer the power to the primary winding pri of the transformer 120 and may form a resonance tank with inductance from the transformer 120. In this case, the inductance from the transformer 120 may be magnetizing inductance or leakage inductance.

The outputting unit 140 may stabilize and output the transformed power from the secondary winding sec of the transformer 120.

The controlling unit 150 may control the switching of the switching unit 110 based on information regarding the resonance power input from the resonance unit 130 to the primary winding pri of the transformer 120, and more particularly, may control the switching of the switching unit 110 by estimating the output power based on the information regarding the resonance power.

Therefore, the controlling unit 150 does not require the information of the output power and may not use an insulating element of a one-to-one transformer, a photo coupler, or the like in order to receive the information of the output power from the secondary side.

In addition, in the case in which the resonance-type power supply apparatus according to the embodiment of the present invention is used in a wireless power transfer system without using the insulating element described above, the switching unit 110, the primary winding pri of the transformer 120, the resonance unit 130, and the controlling unit 150 may be included in a first electronic device A, and the secondary winding sec of the transformer 120 and the outputting unit may be included in a second electronic device B physically separated from the first electronic device A and wirelessly receiving the power.

Figure 2:
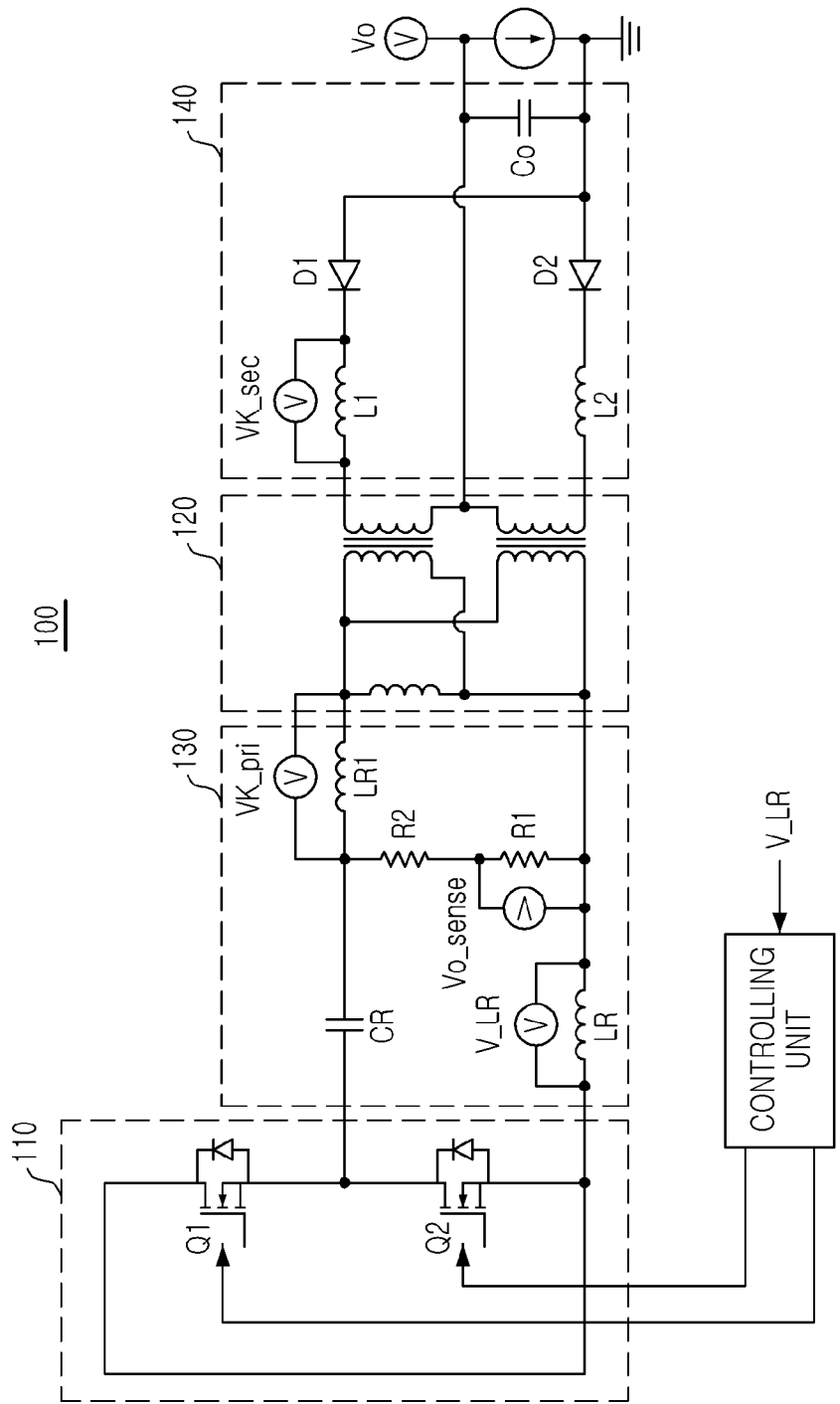
FIGS. 2 and 4 are circuit diagrams schematically showing the resonance-type power supply apparatus according to embodiments of the present invention.
Figure 3A:
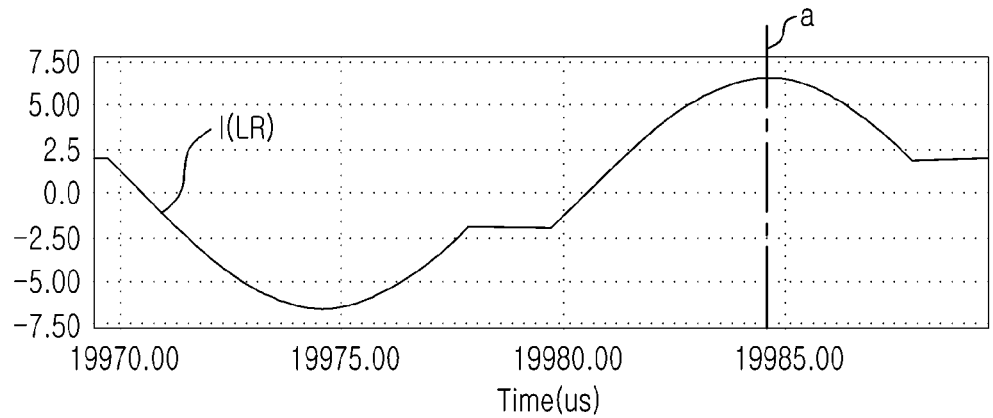
FIGS. 3A through 3C, FIG. 5A, and FIG. 5B are graphs showing a signal waveform of a main portion of the resonance-type power supply apparatus according to the embodiment of the present invention shown in FIGS. 2 and 4.
Figure 3B:
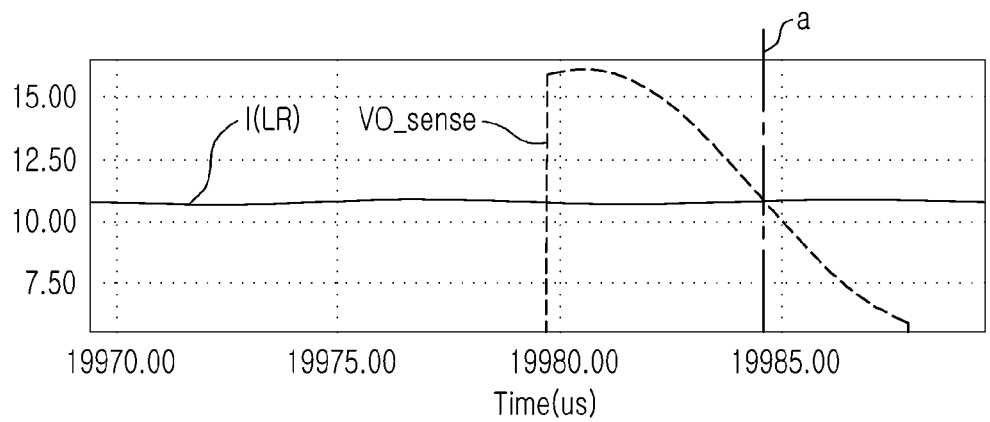
Figure 3C:
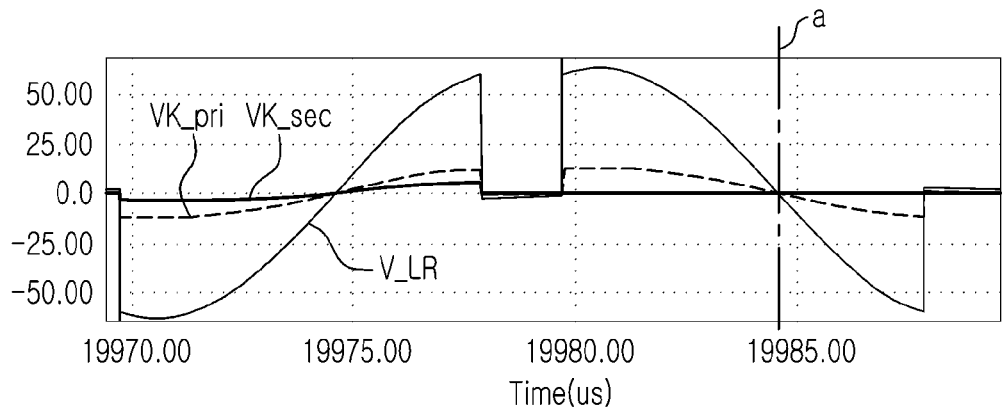
Figure 4:
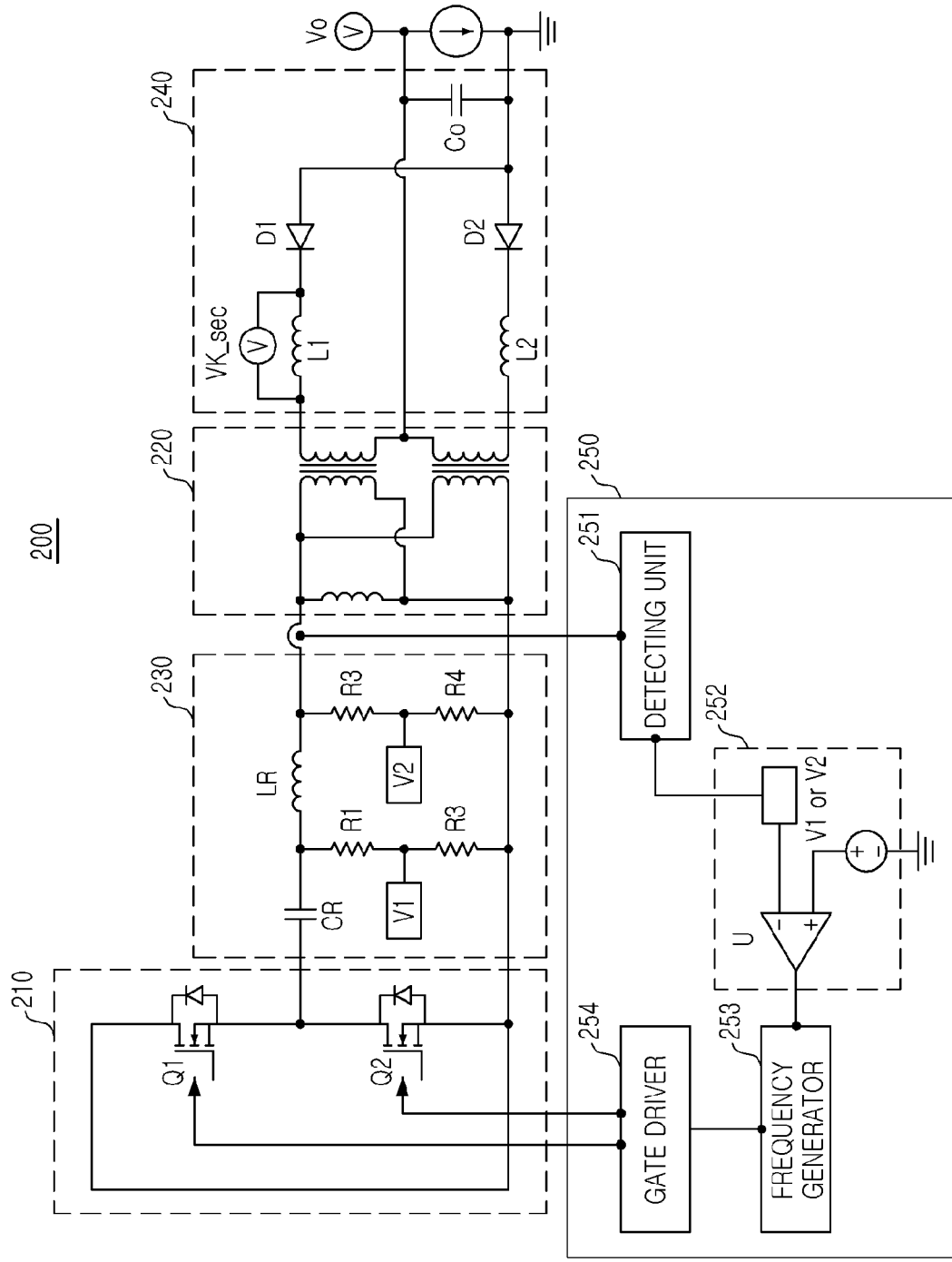

FIGS. 2 and 4 are circuit diagrams schematically showing the resonance-type power supply apparatus according to embodiments of the present invention, and FIGS. 3A through 3C, FIG. 5A, and FIG. 5B are graphs showing a signal waveform of a main portion of the resonance-type power supply apparatus according to the embodiment of the present invention shown in FIGS. 2 and 4.

First, referring to FIG. 2, the resonance-type power supply apparatus 100 according to the embodiment of the present invention may include the resonance unit 130 having a serial resonant type resonance tank. To this end, the resonance unit 130 may form the resonance tank with inductance from the transformer 120 by including a capacitor CR and an inductor LR1 and may further include a resonance inductor LR, and in order to easily sense voltage across both end terminals of the resonance inductor LR, the resonance inductor LR may be connected to a ground of the primary side.

The controlling unit 150 may control switching of first and second switches Q1 and Q2 of the switching unit 110 by estimating voltage across both end terminals of the primary winding of the transformer 120 as a voltage level of the output power when the voltage V_LR across both end terminals of the resonance inductor LR is zero voltage.

The outputting unit 140 may stabilize and output the transformed power from the secondary winding of the transformer 120 by being provided with first and second inductors L1 and L2, first and second diodes D1 and D2, and a capacitor Co.

A technology estimating the voltage across both end terminals of the primary winding of the transformer 120 of the controlling unit 150, as the voltage level of the output power, will be described in more detail with reference to FIGS. 3A through 3C.

First, FIG. 3A is a graph showing current I (LR) of the resonance inductor LR, FIG. 3B is a graph showing voltage Vo of the output power and voltage Vo_sense across both end terminals of the primary winding of the transformer 120, and FIG. 3C is a graph showing voltage V_LR across both end terminals of the resonance inductor LR, voltage VK_pri of the primary winding, and voltage VK_sec of the secondary winding.

Referring to FIGS. 3A and 3C, it may be appreciated that when the current I (LR) of the resonance inductor LR has a maximum value ('a'), the level of voltage V_LR across both end terminals of the resonance inductor LR is zero (0), and referring to FIG. 3B, it may be appreciated that the voltage Vo_sense across both end terminals of the primary winding of the transformer 120 in this case is equal to the voltage Vo of the output power. That is, the controlling unit 150 may control the switching of the switching unit 110, by estimating the voltage Vo_sense across both end terminals of the primary winding of the transformer 120, as the voltage Vo of the output power, when the voltage V_LR across both end terminals of the resonance inductor LR is zero (0).

Next, referring to FIG. 4, a resonance-type power supply apparatus 200 according to another embodiment of the present invention may include a resonance unit 230 having an inductor-inductor-capacitor (LLC) resonant type resonance tank. To this end, the resonance unit 230 may form the resonance tank with the inductance from the transformer 120 by including a capacitor CR and an inductor LR.

A controlling unit 250 may detect a maximum value of resonance current input to a transformer 220 and may compare voltages V1 and V2 between the capacitor CR and a ground or between the inductor (LR) and the ground, to a preset reference voltage, so as to control a switching of a switching unit 210 according to the comparison result.

To this end, the controlling unit 250 may include a detecting unit 251 detecting a maximum value of resonance current input to the transformer 220, a comparing unit 252 having an error amplifier U selecting one of first voltage V1 and second voltage V2 between the capacitor CR and the ground or between the inductor LR and the ground and comparing the selected voltage to the preset reference voltage, a frequency generator 253 generating a frequency signal having a switching frequency varied according to the comparison result of the comparing unit 252, and a gate driver 254 providing a switching signal controlling switching of first and second switches Q1 and Q2 of the switching unit 210 in response to the frequency signal of the frequency generator 253.

Similar to this, an outputting unit 240 may stabilize and output the transformed power from the secondary winding of the transformer 220 by including first and second inductors L1 and L2, first and second diodes D1 and D2, and a capacitor Co.

A technology estimating one the first voltage V1 and the second voltage V2 between the capacitor CR and the ground or between the inductor LR and the ground, as a voltage level of an output power, will be described in more detail with reference to FIGS. 5A and 5B.

Figure 5A:
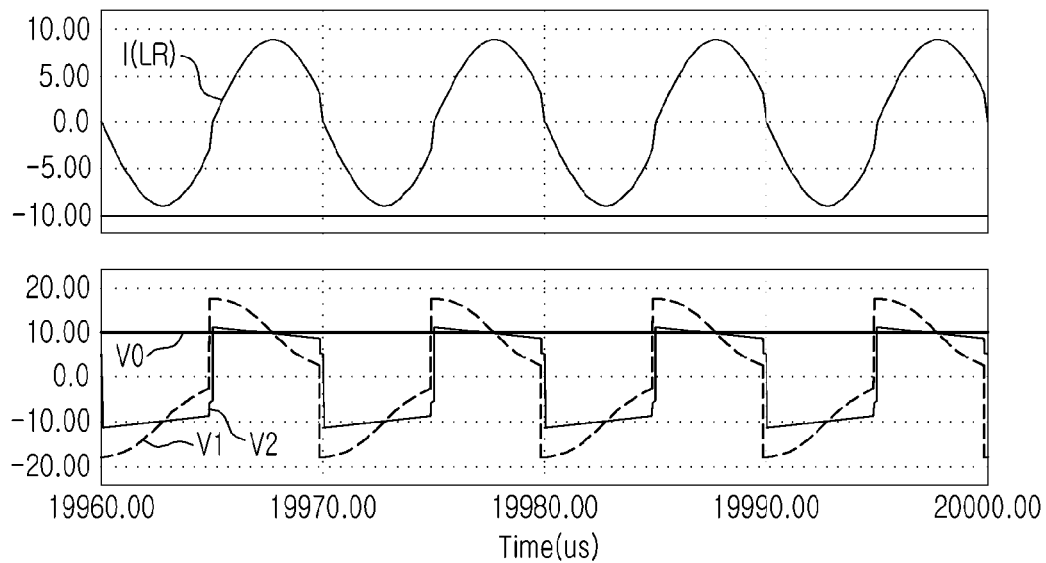
Figure 5B:
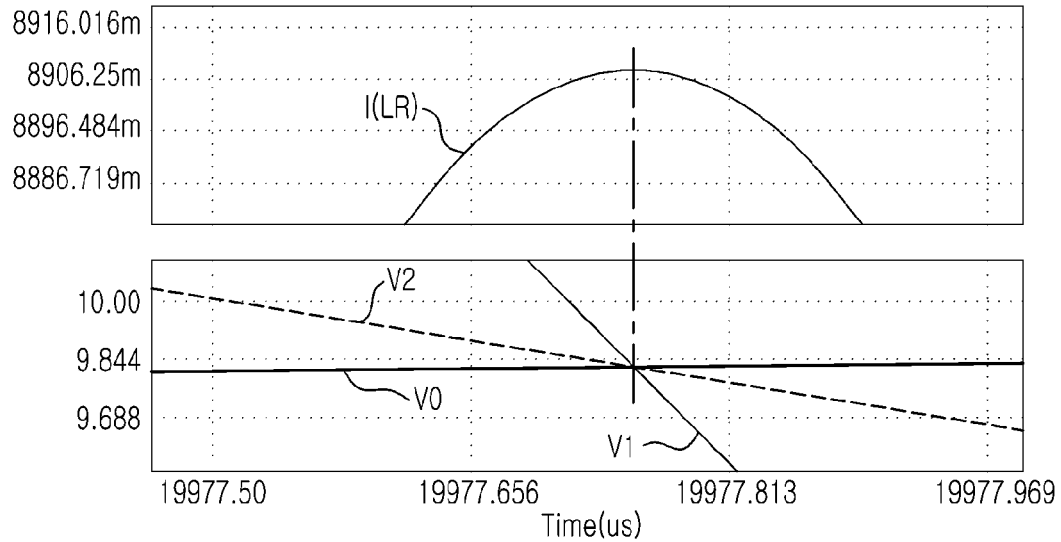

First, FIG. 5A is a graph showing current I (LR) of the resonance inductor LR, the first voltage V1 or the second voltage V2 between the capacitor CR and the ground or between the inductor LR and the ground, and voltage Vo of the output power, respectively, and FIG. 5B is a graph enlarging a portion of FIG. 5A.

Referring to FIGS. 5A and 5B, in the case in which the current I (IR) of the resonance inductor LR has a maximum value, it may be appreciated that the first voltage V1 or the second voltage V2 between the capacitor CR and the ground or between the inductor LR and the ground is equal to the voltage Vo of the output power. That is, in the case in which the current I (IR) of the resonance inductor LR has the maximum value, the controlling unit 250 may control the switching of the switching unit 210, by estimating the first voltage V1 or the second voltage V2 between the capacitor CR and the ground or between the inductor LR and the ground, as the voltage Vo of the output power.

As set forth above, according to the embodiment of the present invention, the primary side switching is controlled by estimating the output power based on the resonance current of the primary side, such that the manufacturing costs may be reduced and the degree of freedom of the circuit design may be increased, and in particular, the resonance-type power supply apparatus may also be freely used in the wireless power transfer apparatus.

While the present invention has been shown and described in connection with the embodiments, it will be apparent to those skilled in the art that modifications and variations can be made without departing from the spirit and scope of the invention as defined by the appended claims.

What is claimed is:
1. A resonance-type power supply apparatus, comprising:
a switching unit switching input power;
a transformer including a primary winding receiving the power switched by the switching unit and a secondary winding magnetically coupled to the primary winding and having a preset turns ratio, and transforming the received switched power according to the turns ratio;
a resonance unit electrically connected between the switching unit and the transformer and providing a resonance tank resonating with inductance from the transformer; and
a controlling unit controlling the switching of the switching unit based on timing that resonance power information input to the primary winding of the transformer by the resonance unit meets a reference value.

2. The resonance-type power supply apparatus of claim 1, wherein the controlling unit controls the switching of the switching unit by estimating output power based on the resonance power information.

3. The resonance-type power supply apparatus of claim 2, wherein the resonance unit forms the resonance tank with the inductance from the transformer by including at least one capacitor and at least one inductor.

4. The resonance-type power supply apparatus of claim 3, wherein the resonance unit forms one resonance tank of a serial resonance tank and an inductor-inductor-capacitor (LLC) resonance tank.

5. The resonance-type power supply apparatus of claim 3, wherein the resonance unit further includes at least one resonance inductor.

6. The resonance-type power supply apparatus of claim 2, wherein the controlling unit controls the switching of the switching unit by estimating the output power based on current information of resonance power of the resonance unit.

7. The resonance-type power supply apparatus of claim 5, wherein the controlling unit controls the switching of the switching unit by estimating the output power based on voltage information regarding the resonance power of the resonance unit.

8. The resonance-type power supply apparatus of claim 6, wherein the controlling unit detects a maximum value of resonance current of the resonance unit and estimates resonance voltage provided when the maximum value of the resonance current is detected, as the output power.

9. The resonance-type power supply apparatus of claim 7, wherein the controlling unit detects voltage across both end terminals of the at least one resonance inductor and estimates a voltage level of power applied to the primary winding of the transformer when the level of the detected voltage across both end terminals of the at least one resonance inductor is zero (0), as the output power.

10. The resonance-type power supply apparatus of claim 1, further comprising an outputting unit stabilizing and outputting converted power from the secondary winding of the transformer.

11. The resonance-type power supply apparatus of claim 10, wherein the switching unit, the primary winding of the transformer, the resonance unit, and an the controlling unit are included in a first electronic device, and the secondary winding of the transformer and the outputting unit are included in a second electronic device physically separated from the first electronic device.

12. A resonance-type power supply apparatus, comprising:
a switching unit switching input power;
a transformer including a primary winding receiving the power switched by the switching unit and a secondary winding magnetically coupled to the primary winding and having a preset turns ratio, and transforming the received switched power according to the turns ratio;
a resonance unit electrically connected between the switching unit and the transformer and providing a resonance tank resonating with inductance from the transformer in a serial resonance scheme; and
a controlling unit controlling the switching of the switching unit by estimating output power based on timing that resonance power information input to the primary winding of the transformer by the resonance unit meets a reference value.

13. The resonance-type power supply apparatus of claim 12, wherein the resonance unit forms the resonance tank with the inductance from the transformer by including a capacitor and a first inductor.

14. The resonance-type power supply apparatus of claim 13, wherein the resonance unit further includes at least one resonance inductor.

15. The resonance-type power supply apparatus of claim 14, wherein the controlling unit detects a both-end voltage of the resonance inductor and estimates a voltage level of power applied to the primary winding of the transformer provided when the level of the detected voltage across both end terminals of the resonance inductor is zero (0), as the output power.

16. The resonance-type power supply apparatus of claim 11, further comprising an outputting unit stabilizing and outputting converted power from the secondary winding of the transformer.

17. The resonance-type power supply apparatus of claim 16, wherein the switching unit, the primary winding of the transformer, the resonance unit, and the controlling unit are included in a first electronic device, and the secondary winding of the transformer and the outputting unit are included in a second electronic device physically separated from the first electronic device.

18. A resonance-type power supply apparatus, comprising:
a switching unit switching input power;
a transformer including a primary winding receiving the power switched by the switching unit and a secondary winding magnetically coupled to the primary winding and having a preset turns ratio, and transforming the received switched power according to the turns ratio;
a resonance unit electrically connected between the switching unit and the transformer and providing a resonance tank resonating with inductance from the transformer in an inductor-inductor-capacitor (LLC) resonance scheme; and
a controlling unit controlling the switching of the switching unit by estimating output power based on timing that resonance current information input to the primary winding of the transformer by the resonance unit meets a reference value.

19. The resonance-type power supply apparatus of claim 18, wherein the resonance unit forms the resonance tank with the inductance from the transformer by including a capacitor and an inductor.

20. The resonance-type power supply apparatus of claim 19, wherein the controlling unit detects a maximum value of resonance current of the resonance unit and estimates resonance voltage provided when the maximum value of the resonance current is detected, as the output power.

21. The resonance-type power supply apparatus of claim 20, wherein the controlling unit includes: a detecting unit detecting the maximum value of the resonance current; a comparing unit comparing one voltage of voltage between the capacitor and a ground and voltage between the inductor and the ground when the maximum value of the resonance current is detected by the detecting unit, to preset reference voltage; a frequency generator generating a frequency signal having a switching frequency according to the comparison result of the comparing unit; and a gate driver providing a switching signal controlling the switching of the switching unit in response to the frequency signal.

22. The resonance-type power supply apparatus of claim 18, further comprising an outputting unit stabilizing and outputting converted power from the secondary winding of the transformer.

23. The resonance-type power supply apparatus of claim 22, wherein the switching unit, the primary winding of the transformer, the resonance unit, and an the controlling unit are included in a first electronic device, and the secondary winding of the transformer and the outputting unit are included in a second electronic device physically separated from the first electronic device.

* * * * *